June 8, 1937. W. E. OSBORNE 2,082,845
CREAM REMOVER FOR MILK BOTTLES
Filed June 12, 1936
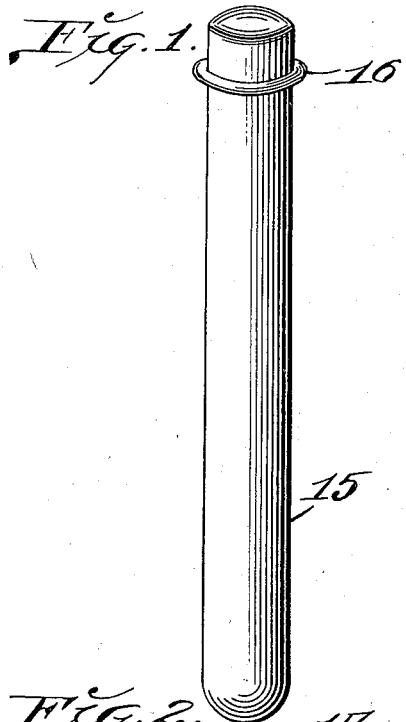
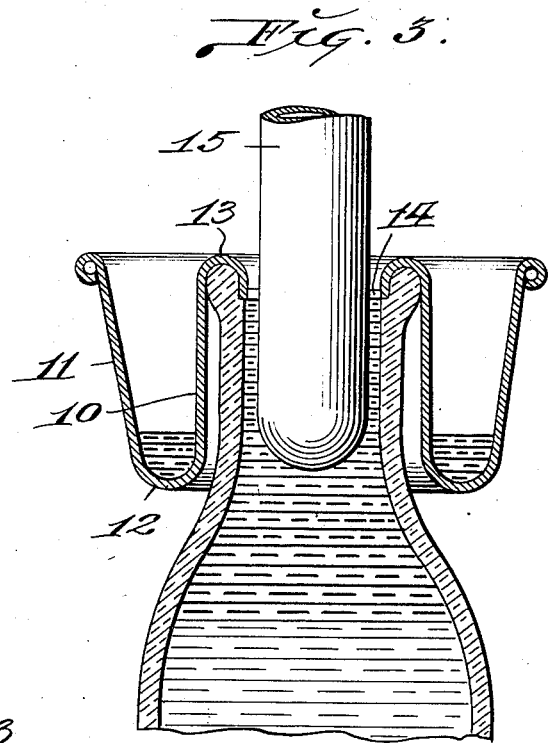
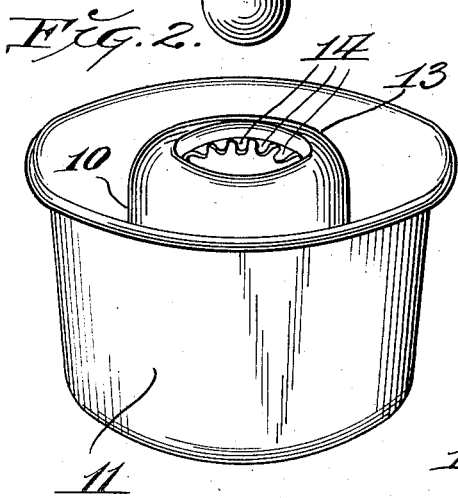
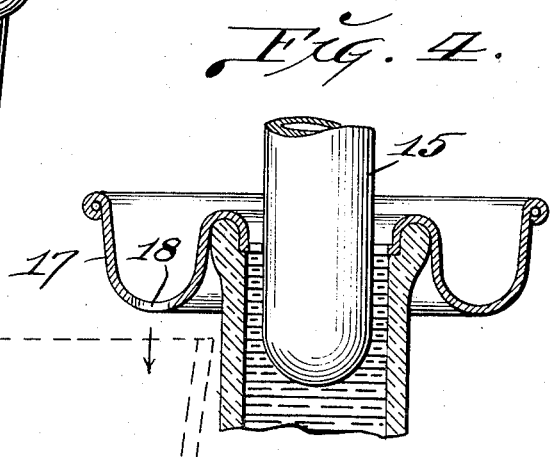
INVENTOR.
WM. E. OSBORNE.
BY Martin P. Smith ATTY.

Patented June 8, 1937

2,082,845

UNITED STATES PATENT OFFICE 2,082,845

CREAM REMOVER FOR MILK BOTTLES

William E. Osborne, Los Angeles, Calif.

Application June 12, 1936, Serial No. 84,881

2 Claims. (Cl. 210—51.5)

My invention relates to a device particularly intended for the removal of cream from milk bottles, and the construction herein set forth is an improvement on a similar invention set forth in an application for patent filed by me January 20, 1932, Serial No. 587,723.

The principal object of my present invention is, to generally improve upon and simplify the construction of the cream remover disclosed in my aforesaid application for patent, as well as other forms of similar devices, and further, to provide a relatively simple, practical and inexpensive device that may be conveniently applied to the mouth of a milk bottle and manipulated in order to collect in a receptacle all of the cream that has accumulated on top of the body of milk within the bottle.

A further object of my invention is, to provide a device of the character referred to that includes a receptacle in the form of an annular cup that is adapted to be positioned on top of a milk bottle and which serves as a receptacle for the cream after the same discharges from the bottle, and said device also including a plunger that is adapted to be inserted through an opening in the center of the cup and through the mouth and neck of the milk bottle, in order to displace the cream in the upper portion of the bottle of milk and cause said cream to rise and discharge into the cup.

With the foregoing and other objects in view my invention consists in certain novel features of construction and arrangements of parts that will be hereinafter more fully described and claimed and illustrated in the accompanying drawing in which:

Fig. 1 is a perspective view of the plunger that forms a part of my improved cream remover.

Fig. 2 is a perspective view of the annular cup.

Fig. 3 is a vertical section taken through the upper portion of a milk bottle, and showing the cream remover positioned on said bottle.

Fig. 4 is a vertical section similar to Fig. 3, and showing a modified form of the device.

Referring by numerals to the accompanying drawing which illustrates a preferred embodiment of my invention, 10—11 designate respectively, the inner and outer walls of an annular cup, preferably formed of sheet metal or thin cast metal, and the lower ends of said walls are united by a rounded bottom 12. The upper end of the inner wall 10 extends inwardly and thence downwardly to form an annular inverted U-shaped lip 13, that is adapted to fit snugly over the rounded lip that surrounds the mouth of the conventional milk bottle.

Formed integral with and projecting horizontally inward from the lower inner edge of lip 13, is a series of teeth or projections 14, and when the cup is applied to the milk bottle, these teeth rest on the internal shoulder that is formed within the mouth of the milk bottle and the support of the paper or cardboard disc that serves as a closure for the bottle.

A cylindrical plunger 15, preferably formed of metal, is provided near its upper end with a rib or flange 16, to facilitate manipulation, and the diameter of this plunger is such that it will readily pass through the opening between the inner ends of the teeth 14.

In the use of this form of cream remover, the annular cup is applied to the upper end of the bottle with the inverted U-shaped member 13 fitting snugly on the lip of the bottle, and the lower end of the plunger 15 is now moved downward through the opening between the inner ends of the teeth 14 and through the neck of the bottle.

As the plunger moves downward into the cream on top of the bottle of milk within the bottle, a corresponding amount of the cream will be displaced and this cream is forced upwardly through the notches or spaces between the teeth 14 over the inverted U-shaped member 13, and the cream thus displaced will flow into the lower portion of the cup.

By moving the plunger 15 slowly downward into the bottle and holding said bottle firmly against movement, practically all of the cream on top of the body of milk within the bottle may be caused to discharge from the bottle into the cup or receptacle.

In the modified construction illustrated in Fig. 5, an annular cup 17 similar in construction but somewhat shorter than the form of cup illustrated in Figs. 2 and 3, is provided in its lower portion with a discharge opening 18, and when this form of device is used, the cream that is caused to flow into the cup will discharge through the opening 18 into a receptacle positioned beneath said aperture.

Thus it will be seen that I have provided a cream remover for milk bottles that is relatively simple in construction, inexpensive of manufacture and very effective in performing the functions for which it is intended. The parts of the device may be readily pressed or spun from sheet metal, and after used, the parts may be readily cleansed and sterilized so as to be kept in sanitary condition.

It will be understood that minor changes in the size, form and construction of the various parts of my improved cream remover for milk bottles may be made and substituted for those herein shown and described without departing from the spirit of my invention, the scope of which is set forth in the appended claims.

I claim as my invention:

1. In a cream remover for milk bottles, a cup having inner and outer walls spaced apart to form an annular chamber, the lower portions of which walls are connected, an integral flange projecting inwardly and downwardly from the upper edge of the inner wall and adapted to rest on the lip of a milk bottle and a series of teeth projecting inwardly from the inner lower edge of said flange.

2. In a cream remover for milk bottles, a cup having inner and outer walls spaced apart to form an annular chamber, the lower portions of which walls are connected, an integral flange projecting inwardly and downwardly from the upper edge of the inner wall and adapted to rest on the lip of a milk bottle, a series of teeth projecting inwardly from the inner lower edge of said flange and a plunger adapted to be inserted through the opening that is surrounded by said teeth.

WILLIAM E. OSBORNE.